United States Patent
Ravikumar

(10) Patent No.: US 7,597,743 B2
(45) Date of Patent: Oct. 6, 2009

(54) CONFIGURATION AND PROCESS FOR CARBONYL REMOVAL

(75) Inventor: Ravi Ravikumar, Lancaster, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 457 days.

(21) Appl. No.: 10/543,438

(22) PCT Filed: Jan. 21, 2004

(86) PCT No.: PCT/US2004/001796

§ 371 (c)(1),
(2), (4) Date: May 3, 2006

(87) PCT Pub. No.: WO2004/069749

PCT Pub. Date: Aug. 19, 2004

(65) Prior Publication Data

US 2008/0102009 A1    May 1, 2008

(30) Foreign Application Priority Data

Jan. 28, 2003    (WO) .................... PCT/US03/02696

(51) Int. Cl.
*B01D 53/02*    (2006.01)
(52) U.S. Cl. .................... 95/133; 110/203; 110/345; 423/210; 502/400

(58) Field of Classification Search .................. 95/133; 110/203, 345; 423/210; 502/400
See application file for complete search history.

(56) References Cited

U.S. PATENT DOCUMENTS

| | | | | | |
|---|---|---|---|---|---|
| 2,728,792 | A | * | 12/1955 | Carter et al. | 568/456 |
| 3,841,901 | A | * | 10/1974 | Novinski et al. | 428/404 |
| 3,867,183 | A | * | 2/1975 | Cole | 427/124 |
| 3,900,646 | A | * | 8/1975 | Clyde | 427/595 |
| 4,086,262 | A | * | 4/1978 | Chang et al. | 518/716 |
| 4,740,361 | A | | 4/1988 | Heyd et al. | 423/210 |
| 5,008,160 | A | | 4/1991 | Jenkin | 428/656 |
| 5,145,716 | A | | 9/1992 | Paserin et al. | 427/55 |
| 5,197,993 | A | * | 3/1993 | Ferrando et al. | 29/2 |
| 5,451,384 | A | | 9/1995 | Carr | 423/210 |
| 5,601,892 | A | * | 2/1997 | McIntosh | 428/35.8 |
| 5,626,692 | A | * | 5/1997 | Rohatgi et al. | 148/538 |
| 5,967,400 | A | * | 10/1999 | Bell et al. | 228/124.5 |
| 6,077,487 | A | | 6/2000 | Snow | 423/210 |
| 6,165,428 | A | | 12/2000 | Eijkhoudt et al. | 423/210 |
| 6,911,065 | B2 | * | 6/2005 | Watanabe et al. | 95/90 |

* cited by examiner

*Primary Examiner*—Duane Smith
*Assistant Examiner*—Christopher P Jones
(74) *Attorney, Agent, or Firm*—Fish & Associates, PC

(57) ABSTRACT

A plant includes an adsorber in which a metal is plated onto a non-metallic sacrificial materials from a metal carbonyl at a predetermined temperature. Particularly preferred adsorbers include two sections, wherein a first metal (e.g., nickel) is plated onto graphite in the first section, and wherein a second metal (e.g., iron) is plated onto graphite in the second section.

4 Claims, 1 Drawing Sheet

CONFIGURATION AND PROCESS FOR CARBONYL REMOVAL

This application claims the benefit of our co-pending International patent application with the serial number PCT/US03/02696, filed on Jan. 28, 2003, and which is incorporated by reference herein.

FIELD OF THE INVENTION

The field of the invention is gas purification, and especially removal of metal carbonyls from gases for combustion and/or synthesis.

BACKGROUND OF THE INVENTION

Gasification of residues, and especially of heavy oil based products (e.g., petroleum coke, visbreaker bottoms, asphaltenes, vacuum bottoms, etc.), is often accompanied by generation of significant quantities of metal carbonyls. For example, nickel and/or iron carbonyls are typically formed in gasification of vacuum bottoms. Metal carbonyls are highly undesirable as they are not only toxic and carcinogenic at relatively low quantities, but also plate in various portions of a combustion turbine.

To avoid such problems, numerous approaches have been developed to at least partially remove metal carbonyls from various gas streams. For example, surfaces in contact with a gas stream containing the metal carbonyls may be coated with austenitic (18/8) stainless steel to avoid reaction with the metal carbonyls. While such a coating may reduce metal plating on the so treated surfaces to at least some degree, use of stainless steel is relatively expensive. Furthermore, coating of surfaces susceptible to metal plating with stainless steel will not (at least to a significant degree) reduce the concentration of metal carbonyls in the gas stream and therefore only shift the problems associated with metal carbonyls to a location downstream of the stainless steel coating.

In another approach, Dvorak et al. employed spent catalysts comprising Cu and/or CuO and ZnO to reduce the concentration of sulfur compounds and iron carbonyl in a gas stream (*Chemical Abstracts*, Vol. 96 (1982), Abstract No. 164.903e). While the spent catalysts were relatively effective for removal of sulfur compounds, only small amounts of iron carbonyl were removed from the gases. Moreover, Cu and CuO sorbents are known to exhibit significant activity as hydrogenation catalysts. Consequently, when such catalysts are used in syngas, conversion of at least a portion of the syngas to methane and alcohols is almost unavoidable.

To improve removal of iron carbonyl from a gas stream, the gas stream may be contacted with ZnO and/or ZnS as proposed in EP023911A2. In such systems, ZnO and/or ZnS reduced the concentration of iron carbonyl to a significant extent (e.g., 99%), however, nickel carbonyl was removed in this system to a considerably lower degree (e.g., 77%).

In yet another approach, zeolites have been employed to reduce metal carbonyls from gas streams (Golden et al. *Sep. Sci. and Techn.* (1991), 26, 12: 1559-1574). While zeolites typically reduce the concentration of metal carbonyls from a syngas with relatively high efficiency, the zeolites system described by Golden et al was limited to gas streams that are substantially free of hydrogen sulfide.

In a still further approach, as described in U.S. Pat. No. 5,451,384 to Carr, a gas stream containing metal carbonyls is contacted with lead oxide that is bound on a solid support (e.g., alumina). Lead oxide-based removal of metal carbonyls, and particularly iron carbonyl, is relatively effective, however, has various significant disadvantages. Among other things, the gas stream typically needs to be free of appreciable quantities of sulfur compounds to avoid sorbent poisoning. Furthermore, a highly toxic lead nitrate solution is employed to coat the carrier via a calcination process, which poses environmental and health hazards. Moreover, operation of lead oxide beads at temperatures higher than 100° C. will tend to produce carbon deposits, especially in the absence of hydrogen.

To circumvent at least some of the problems associated with lead oxide, a hydrophobic porous adsorbent may be employed as described in U.S. Pat. No. 6,165,428 to Eijkhout et al. Suitable adsorbents include Si/Al-containing zeolites with a pore size of between about 0.5 nm to 4.0 nm and an average pore volume of 0.005 ml/g sorbent. Among various other advantages, Eijkhout's system can operate under conditions where the gas stream comprises significant amounts of hydrogen sulfide and water. However, effective removal of metal carbonyls is at least in part dependent on proper pore size as Si/Al-containing zeolites are thought to act as molecular sieves. Consequently, disposal of saturated Si/Al-containing zeolites will still pose substantial health and environmental risks due to the high toxicity and low boiling point of metal carbonyls.

Further known adsorption methods for metal carbonyls include those described in U.S. Pat. No. 3,466,340 in which iron carbonyl is removed from liquid methanol or other alcohols using a solid ion exchange resin containing amino groups. Similarly, in French Pat. No. 2,040,232, iron carbonyl-contaminated methanol is passed through a bed of $Fe_2O_3$ pellets to remove the iron carbonyl.

In U.S. Pat. No. 4,608,239, the inventors describe iron carbonyl removal from a gas using alkali metal hydroxide in association with a high boiling hydroxylic solvent to form nonvolatile iron carbonylate salts, which are then separated from the gas. Alternatively, as described in U.S. Pat. No. 3,780,163, ozone is reacted with iron carbonyl from a gas containing carbon monoxide or from a liquid (e.g., ethyl acetate). However, all, or almost all of such known processes either result in a relatively toxic product that needs to be disposed of, or use highly toxic reagents that need to be destroyed or otherwise removed where such reagents are employed in molar excess to the metal carbonyl.

Therefore, although various configurations and processes are known in the art to remove metal carbonyls from a gas stream, all or almost all suffer from one or more disadvantages. Thus, there is still a need for improved configurations and processes for carbonyl removal.

SUMMARY OF THE INVENTION

The present invention is directed to plants having an adsorber that includes a sacrificial non-metallic material onto which a metal is plated from a metal carbonyl-containing feed gas at a predetermined temperature. Contemplated metal carbonyls include nickel carbonyl, iron carbonyl, and cobalt carbonyl, and especially suitable feed gases include those produced from gasification of petroleum coke, visbreaker bottoms, asphaltenes, and/or vacuum bottoms.

In especially preferred aspects, the sacrificial non-metallic material comprises graphite, and the feed gas comprises a syngas from a gasification plant. Consequently, the predetermined temperatures will generally be in the range of between 150° C. to 200° C. Where the metal is nickel, preferred temperatures are between 150° C. to 170° C., and where the metal is iron, the preferred temperature is between 180° C. to 200° C.

Further preferred configurations also include those in which the adsorber has a first and second section (both comprising the sacrificial non-metallic material), wherein nickel is plated onto the material in the first section at a temperature between 150° C. to 170° C., and wherein iron is plated onto the material in the second section at a temperature between 180° C. to 200° C.

It is further contemplated that in at least some plants the adsorber will be coupled to at least one component (e.g., gas turbine coupled to a power generator) of an integrated gasification combined cycle plant, and/or that the feed gas is heated by a gas turbine feed gas preheater. To reduce, or even prevent plating of a metal onto the heat exchanger, it is further contemplated that the feed gas is heated by an aluminum-containing surface in a heat exchanger. Furthermore, it is generally contemplated that a second adsorber may be employed in series (or parallel) to allow for continuous operation.

Therefore, a method of reducing a metal carbonyl concentration in a feed gas includes one step in which a feed gas is provided that includes a metal carbon yl. In another step, the feed gas is contacted in an adsorber with a sacrificial non-metallic material at a temperature sufficient to plate a metal from the metal carbonyl onto the sacrificial non-metallic material. With respect to the components, temperatures, materials, and configurations, the same considerations as provided above apply.

Various objects, features, aspects and advantages of the present invention will become more apparent from the following detailed description of preferred embodiments of the invention, along with the accompanying drawing.

DETAILED DESCRIPTION

Figure 1:
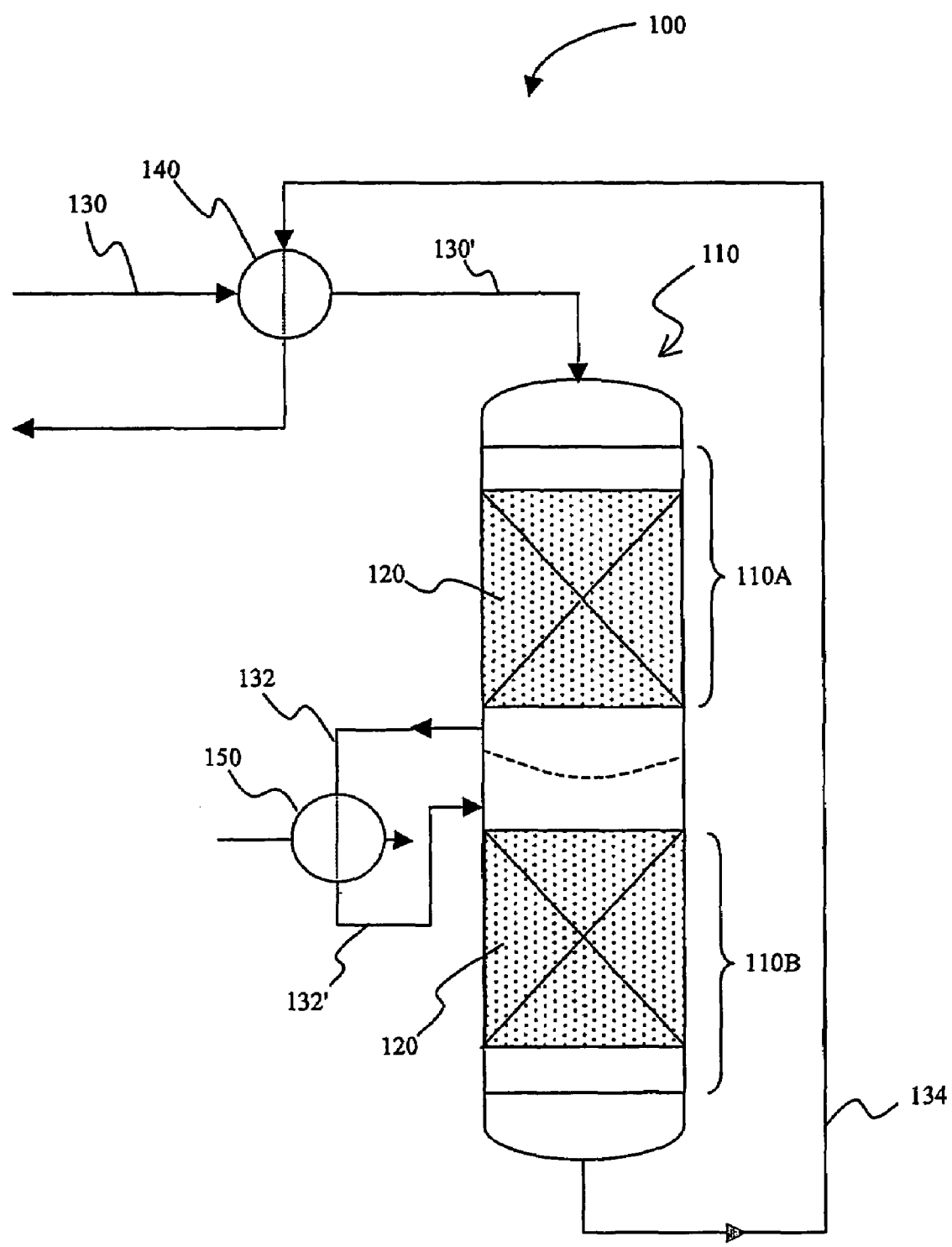
FIG. 1 is a schematic configuration of an exemplary adsorber according to the inventive subject matter.

As used herein, the term "metal carbonyl" refers to a molecule in which a metal in ionic form forms a compound with $(CO)_n^-$, wherein n is typically between 1 and 8, and includes mixed metal carbonyls, in which at least one $(CO)_n^-$ and one other anion form the compound. Particularly contemplated metal carbonyls include nickel carbonyl ($Ni(CO)_4$), iron carbonyl ($Fe(CO)_5$), and cobalt carbonyl ($(CO)_3Co:(CO)_2:Co(CO)_3$). Consequently, particularly contemplated metals include nickel, iron, and cobalt.

As also used herein, the term "the metal plates" refers to the decomposition of a metal carbonyl (which may be in gas and/or liquid phase) and the concomitant deposition of the metal, wherein the metal deposits in elemental form on the sacrificial non-metallic material. Thus, it should be pointed out that the configurations and methods according to the inventive subject matter are drawn to those in which at least part of the metal carbonyl in the feed gas is decomposed and plated as a metal onto the sacrificial non-metallic material. Viewed from another perspective, the majority (i.e., at least 50%) of the metal carbonyl is not bound (absorbed) to a solid phase.

As further used herein, the term "sacrificial non-metallic material" refers to any material onto which a metal can be plated from a metal carbonyl, wherein such material is predominantly comprised of atoms other than a metal (i.e., at least 50 atom %). Therefore, suitable materials include various inorganic and organic materials, and all reasonable mixtures thereof. However, it is particularly preferred that the sacrificial non-metallic material predominantly comprises carbon (i.e., at least 80 atom %, more preferably at least 90 atom %, and most preferably at least 98 atom %). For example, especially suitable forms of carbon include graphite, activated carbon, vitreous carbon, fullerenes, etc. Where it is desired that the sacrificial non-metallic material comprises an inorganic material, numerous silicon-, calcium-, or magnesium-containing materials are contemplated. Among such materials, silicates, alumina, and clays are typically preferred.

Furthermore, it should be recognized that contemplated sacrificial non-metallic materials may also include one or more metals on the surface or incorporated in to the material. For example, where the sacrificial non-metallic material is predominantly silicate or zeolite, the material may be coated or doped with iron.

Consequently, it should be, appreciated that the size and configuration of contemplated sacrificial non-metallic materials may vary considerably, and a particular size and configuration will at least to some degree be, determined by the specific materials employed. For example, where the sacrificial non-metallic material is a graphite, powdered, pelletized, or otherwise shaped graphite may be employed. Similarly, wherein the sacrificial non-metallic material comprises vitreous carbon, it is generally preferred that such materials may be in form of a carbon felt. In other aspects, where the sacrificial non-metallic material comprises a silicate or other mineral material, the sacrificial non-metallic material may be shaped in spheres, which may further include openings of predetermined size (e.g., molecular sieves).

With respect to the amount of contemplated sacrificial non-metallic materials used in the adsorber, it is generally contemplated that the quantity of sacrificial non-metallic material will be determined by the actual and/or expected quantity of metal carbonyls in the feed gas. However, it is typically preferred that the amount is selected such that continuous operation of the adsorber can be performed for at least one day, more typically at least 10 days, and most typically at least 30 days.

Still further, it should be recognized that where the adsorber has a first and a second section (infra), the sacrificial non-metallic materials in the first and second sections may be identical or different. For example, where the feed gas comprises nickel carbonyl and iron carbonyl, the sacrificial non-metallic material in the first section may be graphite (to thereby generate nickel coated graphite, which is a commercial commodity), while the sacrificial non-metallic material in the second section may be iron (to thereby generate iron coated iron, which may be disposed of in numerous manners without significant negative environmental impact). Suitable metals (and further configurations) for use in conjunction with the teachings presented herein include those described in our copending International patent application with the serial number PCT/US03/02696, filed on Jan. 28, 2003, which is incorporated by reference herein.

In a particularly preferred aspect of the inventive subject matter, as depicted in FIG. 1, an adsorber configuration 100 includes an adsorber vessel 110 includes a first section 110A that includes sacrificial non-metallic material 120, and a second section 110B that includes sacrificial non-metallic material 120 (chemically identical with the material of the first section 110A). Feed gas 130 is heated to a first temperature T1 in a heat exchanger 140 against treated feed gas stream 134 to heated feed gas 130', which enters the first section 110A of adsorber 110. The feed gas leaving the first adsorber 132 is then further heated to a second temperature T2 in heater 150 to form the further heated feed gas 132', which then enters the second section 110B of adsorber 110. Treated feed gas stream 134 leaves the adsorber after passing through the second section 110B, and heat is extracted from the treated feed gas stream 134 in exchanger 140 to heat the feed gas stream 130.

With respect to the adsorber, it is generally contemplated that suitable adsorbers may have any configuration and/or dimension so long as the contemplated adsorbers include at least some sacrificial non-metallic material, receive a feed gas, and provide the feed gas after contacting the sacrificial non-metallic material to a downstream device (e.g., gas turbine). However, in a particularly preferred aspect of the inventive subject matter, the adsorber comprises a container with a first and second section in which a first and second metal plate onto the sacrificial material, respectively. Alternatively, and especially where only one metal carbonyl is present in the feed gas (or another metal carbonyl is present in relatively low quantities compared to the first metal carbonyl), suitable adsorbers may include only one section.

It is generally preferred that contemplated adsorbers are positioned downstream of a gas turbine feed gas preheater (e.g., a syngas preheater), and upstream of the gas turbine. While not limiting to the inventive subject matter, it is especially preferred that contemplated plants include at least two adsorbers (which may be in parallel/adjacent position relative to each other), which are fluidly coupled in series such that a first adsorber receives the preheated feed gas, and provides a substantially metal carbonyl depleted (i.e., at least 95 mol %, more typically at least 98 mol %, most typically at least 99 mol %) feed gas to the second adsorber, which in this configuration acts as a guard bed and provides the substantially metal carbonyl depleted feed gas to the gas turbine. Furthermore, it is especially preferred that in contemplated configurations the first and second adsorbers are fluidly coupled to a downstream device (e.g., gas turbine) using bypass piping such that (a) the first adsorber can be removed from the plant while the feed gas is continuously provided to the gas turbine via the second adsorber, and (b) that after removing the first adsorber and installing a replacement adsorber with a fresh batch of sacrificial material the second adsorber will act as the leading adsorber (i.e., as the first adsorber).

In alternative configurations, however, the number of adsorbers may vary considerably, and appropriate configurations may include between one and six adsorbers, and even more. For example, where a gas turbine receives a discontinuous supply of feed gas, only one adsorber may be employed. On the other hand, where substantially complete depletion of a continuous supply of feed gas is required, three and even more adsorbers may be employed.

Consequently, depending on the particular number and configuration of adsorbers, two or more adsorbers may be operated in series, in parallel, or in a mixed mode (some adsorbers serial and other adsorbers parallel). However, it is generally preferred that operation of two or more adsorbers will allow for continuous flow of the feed gas (and thereby continuous removal of metal carbonyl from the feed gas) to the gas turbine gas.

Alternatively, and especially where the feed gas comprises syngas that is employed for synthesis of industrial products (e.g., ammonia, methanol, or other alcohols) or hydrogen production, it is contemplated that preferred locations of the adsorber or adsorbers are upstream of a synthesis loop or synthesis reactor. Thus, it should be appreciated that such configurations advantageously reduce the concentration of metal carbonyls in the synthesis process, which may adversely affect catalyst performance due to the build-up of the metal carbonyls (and metals) on the surface of the catalyst.

Consequently, contemplated adsorbers may be employed as a retrofit component, as an upgrade, or in a new plant construction; and it should be appreciated that a particular nature of the plant is not limiting to the inventive subject matter. However, it is generally preferred that suitable plants include a gas turbine, and particularly preferred plants are IGCC plants. Thus, it is contemplated that the gas turbine is coupled to a power generator. There are numerous power generators known in the art, and all of the known power generators are contemplated suitable for use herein. Similarly, there are numerous gas turbines known in the art, and all of the known gas turbines are contemplated suitable for use herein. Exemplary gas turbines include various air-cooled gas turbines, water-cooled gas turbines, and/or integrated steam cooled gas turbines (see e.g., U.S. Pat. No. 4,424,668).

In further aspects of the inventive subject matter, the nature of suitable feed gas may vary considerably, and it is generally contemplated that all gas streams are suitable that (a) can be partially or entirely employed as gas to drive a gas turbine, (b) can be employed for synthesis purposes (e.g., methanol or ammonia manufacture) and (c) will comprise at least temporarily a metal carbonyl. However, especially preferred feed gases include gases formed in a gasification reaction that employs gasification of hydrocarbonaceous materials, and especially heavy oil refinery residues. For example, suitable gasification materials for generation of contemplated feed gases include petroleum coke, visbreaker bottoms, asphaltenes, or vacuum bottoms. Alternatively, numerous other refinery fractions or residues are also considered suitable.

Furthermore, it should be recognized that suitable feed gases may have been treated in one or more processes that change the chemical composition of the feed gas. For example, contemplated feed gases may be subjected to one or more shift conversions prior to entering the adsorber. Alternatively, or additionally, it is contemplated that the feed gas may be subjected to an acid gas removal process (which may or may not completely remove sulfurous compounds in the feed gas). Consequently, a particularly preferred feed gas is a syngas from a gasification of refinery residues after shift conversion and acid gas removal.

Moreover, the feed gas may in further preferred aspects also be subjected to a cooling or heating step, and it is especially preferred that the feed gas is heated in a gas turbine feed gas preheater to a temperature of above 100° C. There are numerous gas turbine feed gas preheaters known in the art, and all of those are considered suitable for use herein (wherein the feed gas heater may also be placed downstream of the adsorber).

With respect to the heat exchangers, it should be recognized that the particular nature of the heat exchangers will not be critical to the inventive subject matter. Therefore, all suitable heaters are contemplated appropriate for use herein. Furthermore, where the feed gas is preheated to the first temperature T1, it should be appreciated that the first heat exchangers may be omitted. Regardless of the number of heat exchangers, it is generally preferred that the portion of the heat exchanger that contacts the feed gas is coated with or comprises a material onto which the metal will not, or only to a relatively small degree plate out. For example, suitable materials include aluminum, or stainless steel.

The particular temperature T1 will typically depend on the specific first metal carbonyl and/or the sacrificial non-metal material, and it is generally preferred that all temperatures are suitable at which at least a portion of the first metal will plate onto the sacrificial material. However, it is even more preferred that the temperature will allow substantially complete (i.e., at least 90%) plating of the first metal from the first metal carbonyl on to the sacrificial material. Similarly, the temperature T2 will typically depend on the specific second metal carbonyl and/or the sacrificial non-metal material, and it is generally preferred that all temperatures are suitable at which at least a portion of the second metal will plate onto the sacrificial material. For example, where the feed gas comprises nickel carbonyl and iron carbonyl, and where the sacrificial material is graphite, the feed gas may be heated to temperature of between 150° C. to 170° C. before entering the first section, and the feed gas leaving the first section may be heated to a temperature is between 180° C. to 200° C. before entering the second section. Thus, selective plating in separate compartments may be achieved. However, it should also be recognized that two or more metals may plated in a single section where desired (which will typically take place at the higher plating temperature for the metal carbonyls). Regardless of the place and/or sequence of plating, it is generally preferred that the temperature will be below a temperature that leads to undesired effects on the feed gas (e.g., carbon deposition from the feed gas at temperatures above 200° C.).

It should still further be recognized that while contemplated configurations and processes are particularly advantageous for plants in which a turbine receives a metal carbonyl containing feed gas, that numerous alternative configurations and processes are also contemplated. Suitable alternative configurations and processes include all configurations and processes in which a metal carbonyl containing gas contacts a surface under conditions that enable at least partial plating of the metal carbonyl onto the surface, and wherein plating of the metal carbonyl is generally considered undesirable, or even detrimental to the surface.

For example, numerous synthetic processes (e.g., ammonia synthesis, synthesis of single or mixed alcohols, or Fischer-Tropsch synthesis of hydrocarbons and hydrogen production) include metal containing catalysts, which can be poisoned by plating of a metal from a metal carbonyl. Other suitable processes may include mole sieves that may be contaminated by the metal carbonyl (e.g., mol sieves of a pressure swing adsorption unit). Therefore, it is contemplated that alternative surfaces include synthesis catalysts, and vessels containing such catalysts. Furthermore, it is contemplated that pipelines, vessels, valves, and other components conveying feed gas containing a metal carbonyl can be protected using adsorbers according to the inventive subject matter. In a still further preferred aspect, it is contemplated that configurations and methods according to the inventive subject matter may also be employed to remove or at least reduce the concentration of metal carbonyls from a gas that is vented into an environment (e.g., plant or atmosphere) to protect the environment.

Therefore, contemplated plants may also include an adsorber comprising a sacrificial non-metallic material onto which a metal is plated from a metal carbonyl contained in a feed gas at a temperature sufficient to plate the metal onto the non-metallic material. Consequently, a method of reducing a metal carbonyl concentration in a feed gas will include one step in which a feed gas is provided that includes a metal carbonyl. In another step, the feed gas is contacted in an adsorber with a sacrificial non-metallic material at a temperature sufficient to plate a metal from the metal carbonyl onto the sacrificial non-metallic material.

Thus, specific embodiments and applications of improved configurations and processes for carbonyl removal have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of reducing a metal carbonyl concentration in a feed gas, comprising:
    forming the feed gas in a gasification process, wherein the feed gas from the gasification process includes a metal carbonyl;
    heating the feed gas upstream of an absorber in a heater to form a heated feed gas; and
    contacting the heated feed gas in an adsorber with a sacrificial non-metallic material at a temperature sufficient to plate a metal from the metal carbonyl onto the sacrificial non-metallic material, wherein the sacrificial non-metallic material comprises graphite.

2. The method of claim 1 wherein at least a portion of the feed gas is a syngas produced from gasification of a material selected from the group consisting of petroleum coke, visbreaker bottoms, asphaltenes, and vacuum bottoms.

3. The method of claim 1 wherein the metal carbonyl is selected from the group consisting of nickel carbonyl, iron carbonyl, and cobalt carbonyl.

4. The method of claim 1 wherein the temperature to plate the metal onto the non-metallic material is in the range of between 150° C. to 200° C.

* * * * *